United States Patent
Ananthanarayanan et al.

(10) Patent No.: US 6,953,907 B2
(45) Date of Patent: Oct. 11, 2005

(54) METHOD FOR METALLURGICALLY JOINING A TUBE TO A MEMBER

(75) Inventors: Venkatasubramanian Ananthanarayanan, Beavercreek, OH (US); Dharmendra M. Ramachandra, Centerville, OH (US); Richard W. Marczewski, Dryden, MI (US)

(73) Assignee: Delphi Technologies, Inc., Troy, MI (US)

( * ) Notice: Subject to any disclaimer, the term of this patent is extended or adjusted under 35 U.S.C. 154(b) by 103 days.

(21) Appl. No.: 10/603,948

(22) Filed: Jun. 25, 2003

(65) Prior Publication Data

US 2004/0035834 A1 Feb. 26, 2004

Related U.S. Application Data

(63) Continuation-in-part of application No. 10/226,179, filed on Aug. 22, 2002, now Pat. No. 6,847,001.

(51) Int. Cl.⁷ .......................... B23K 11/00; B23K 31/02
(52) U.S. Cl. ....................... 219/59.1; 219/61; 228/245; 228/173.4
(58) Field of Search .............................. 219/59.1, 60 R, 219/61; 228/245–256, 173.1, 173.4

(56) References Cited

U.S. PATENT DOCUMENTS

| | | |
|---|---|---|
| 3,784,778 A | 1/1974 | McPherson et al. |
| 4,269,106 A | 5/1981 | Leibhard et al. |
| 4,480,166 A | 10/1984 | Leech |
| 4,496,410 A | 1/1985 | Davis et al. |
| 4,514,614 A | 4/1985 | Stol |
| 4,677,271 A | 6/1987 | Opprecht |
| 4,769,624 A | 9/1988 | Merritt et al. |
| 5,374,800 A | 12/1994 | Yoneda |
| 5,538,076 A | 7/1996 | Nishida et al. |
| 5,786,548 A | 7/1998 | Fanucchi et al. |
| 6,287,513 B1 | 9/2001 | Grady et al. |
| 6,390,124 B1 | 5/2002 | Kido et al. |
| 6,539,837 B2 | 4/2003 | Fanelli et al. |
| 6,586,110 B1 | 7/2003 | Obeshaw |
| 6,615,488 B2 | 9/2003 | Anders et al. |
| 6,623,048 B2 | 9/2003 | Castel et al. |
| 6,689,981 B1 | 2/2004 | Ananthanarayanan |
| 6,693,251 B1 | 2/2004 | Ananthanarayanan |
| 6,717,091 B2 | 4/2004 | Ananthanarayanan |
| 2002/0008387 A1 | 1/2002 | Vasudeva |
| 2004/0035829 A1 | 2/2004 | Ananthanarayanan et al. |
| 2004/0035830 A1 | 2/2004 | Ananthanarayanan et al. |
| 2004/0035832 A1 | 2/2004 | Ananthanarayanan et al. |
| 2004/0035833 A1 | 2/2004 | Ananthanarayanan |
| 2004/0056001 A1 | 3/2004 | Ananthanarayanan |

FOREIGN PATENT DOCUMENTS

| | | |
|---|---|---|
| JP | 55-136584 | 10/1980 |
| JP | 55-136593 | 10/1980 |

*Primary Examiner*—Kiley S. Stoner
(74) *Attorney, Agent, or Firm*—Michael D. Smith (57) ABSTRACT

A method for metallurgically joining a tube to a member. A tube having a flange is obtained, and a member is obtained. The tube and the member are positioned with the flange contacting the member directly and/or indirectly through an intervening welding/brazing joining material. The flange and/or the member is segmented and their contact is a segmented contact at spaced-apart contact areas between the flange and the member. A resistance welding/brazing current path is created, through the tube and the member at a first contact area creating a first weld/braze zone which includes at least some of the flange and at least some of the member. Then, a resistance welding/brazing current path is created through the tube and the member at a different second contact area creating a second weld/braze zone which includes at least some of the flange and at least some of the member.

22 Claims, 9 Drawing Sheets

METHOD FOR METALLURGICALLY JOINING A TUBE TO A MEMBER

CROSS-REFERENCE TO RELATED APPLICATIONS

The present application is a continuation-in-part application of U.S. patent application Ser. No. 10/226,179 filed Aug. 22, 2002 now U.S. Pat. No. 6,847,001.

TECHNICAL FIELD

The present invention relates generally to metallurgy, and more particularly to a method for metallurgically joining a tube to a member.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for attaching parts together include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. Gas metal arc welding requires expensive welding equipment, the molten weld puddle tends to flow away from the joint area depending on weld position resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds. Also, friction welding may not be applicable if no part to be welded can be rotated.

What is needed is an improved method for joining a tube to a member.

SUMMARY OF THE INVENTION

A method of the invention is for metallurgically joining a tube to a member and includes steps a) through e). Step a) includes obtaining a first tube having a flange, and step b) includes obtaining a member. Step c) includes, after steps a) and b), positioning the first tube and the member with the flange contacting the member directly and/or indirectly through an intervening welding/brazing joining material, wherein at least one of the flange and the member is segmented, and wherein the contact between the flange and the member is a segmented contact at a plurality of spaced-apart contact areas between the flange and the member. Step d) includes, after step c), creating a resistance welding/brazing current path through the tube and the member at a first one of the plurality of contact areas creating a first weld/braze zone which includes at least some of the flange and at least some of the member. Step e) includes, after step d), creating a resistance welding/brazing current path through the tube and the member at a different second one of the plurality of contact areas creating a second weld/braze zone which includes at least some of the flange and at least some of the member.

Another method of the invention is for metallurgically joining a tube to a member and includes steps a) through e). Step a) includes obtaining a first tube having a flange, and step b) includes obtaining a member. Step c) includes, after steps a) and b), positioning the first tube and the member with the flange contacting the member directly and/or indirectly through an intervening welding joining material, wherein at least one of the flange and the member is segmented, and wherein the contact between the flange and the member is a segmented contact at a plurality of spaced-apart contact areas between the flange and the member. Step d) includes, after step c), creating a resistance welding current path through the tube and the member at one of the plurality of contact areas creating a weld zone which includes at least some of the flange and at least some of the member. Step e) includes repeating step d) once for each of the remaining ones of the contact areas each time creating a different weld zone which includes at least some of the flange and at least some of the member.

An additional method of the invention is for metallurgically joining a tube to a member and includes steps a) through e). Step a) includes obtaining a first tube having a flange, and step b) includes obtaining a member. Step c) includes, after steps a) and b), positioning the first tube and the member with the flange contacting the member indirectly through an intervening brazing joining material, wherein at least one of the flange and the member is segmented, and wherein the contact between the flange and the member is a segmented contact at a plurality of spaced-apart contact areas between the flange and the member. Step d) includes, after step c), creating a resistance brazing current path through the tube and the member at one of the plurality of contact areas creating a braze zone which includes at least some of the flange and at least some of the member. Step e) includes, repeating step d) once for each of the remaining ones of the contact areas each time creating a different braze zone which includes a least some of the flange and at least some of the member.

Several benefits and advantages are derived from one or more of the methods of the invention. The use of a tube flange in joining a tube to a member provides a stronger joint and allows easier joining of thin walled tubes. By having at least one of the tube flange and the member be segmented providing a segmented contact between the flange and the member allows a smaller current to be used to resistance weld/braze together the tube flange and the member by resistance welding/brazing only at one segmented contact at a time.

DESCRIPTION OF THE PREFERRED EMBODIMENTS

Figure 1:
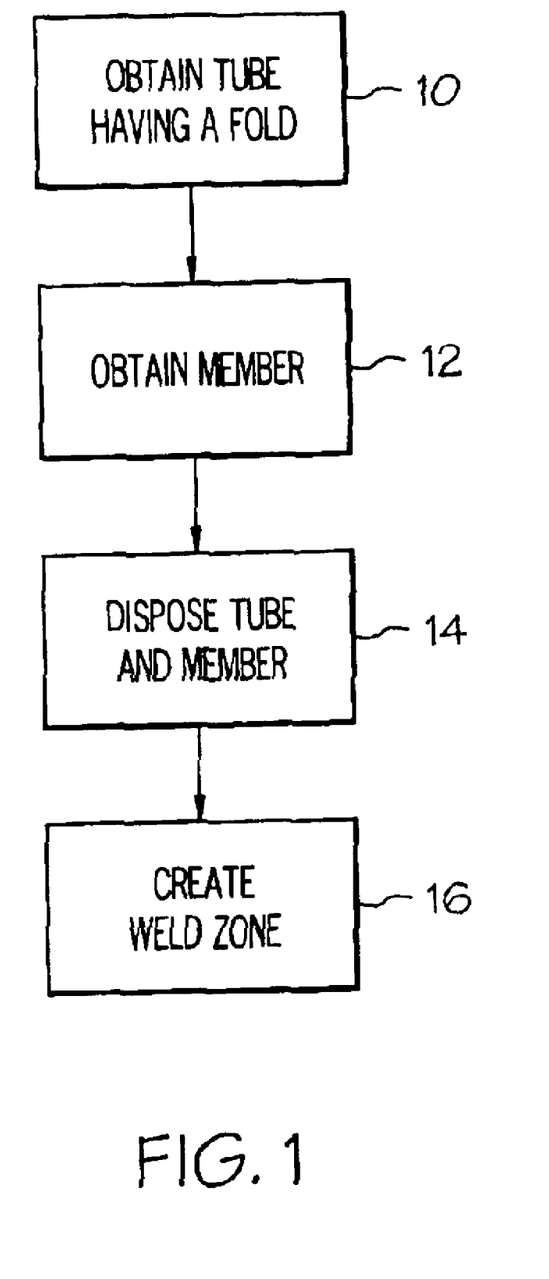
FIG. 1 is a block diagram of the first method of the invention for metallurgically joining a tube to a member.

A first method of the invention is for metallurgically joining a tube to a member and is shown in block diagram form in FIG. 1. The first method includes steps a) through d). Step a) is labeled as Obtain Tube Having A Fold" in block 10 of FIG. 1. Step a) includes obtaining a tube having a longitudinal axis and having an end portion, wherein the end portion includes a fold, and wherein the fold includes longitudinally-spaced-apart first and second fold portions. A "fold" of an end portion of a tube is a fold of the tube wall of an end portion of the tube. Step b) is labeled in block 12 of FIG. 1 as "Obtain Member". Step b) includes obtaining a member. Step c) is labeled in block 14 of FIG. 1 as "Dispose Tube and Member". Step c) includes, after steps a) and b), disposing the tube and the member with the end portion contacting the member. Step d) is labeled as "Create Weld Zone" in block 16 of FIG. 1. Step d) includes, after step c), creating a resistance welding current path through the tube and the member proximate the end portion and relatively moving the end portion deformingly against the member creating a weld zone which includes at least some of the end portion and at least some of the member. The term "proximate" includes, without limitation, the term "at". By "relatively moving" is meant moving the end portion with the member stationary or moving the member with the end portion stationary or moving both the end portion and the member, as is within the level of skill of the artisan.

In one application of the first method, such relative movement squeezes out surface contaminants from between the end portion and the member and such relative movement levels the hills and valleys between the contacting surfaces of the end portion and the member to bring surface atoms of the end portion within atomic bonding distances with surface atoms of the member. In one implementation of the first method, step d) does not melt any of the end portion and does not melt any of the member. In another implementation, step d) melts at least some of the end portion or at least some of the member or melts at least some of the end portion and at least some of the member.

In one example of the first method, the tube is a substantially right-circular cylindrical tube. In another example, the tube has a cross section which has a substantially rectangular shape, wherein the cutting plane for the cross section is perpendicular to the longitudinal axis of the tube. Other examples of the tube are left to the artisan.

In one enablement of the first method, the member is a second tube having a straight second end portion, having a second end portion having a second fold with longitudinally-spaced-apart fold portions, or having a second end portion of arbitrary shape, wherein step c) coaxially aligns the tubes end-to-end and disposes the tubes with end portion to end portion contact. In one variation, the second tube is a substantially right-circular cylindrical tube. In another variation, the second tube has a cross section which has a substantially rectangular shape, wherein the cutting plane for the cross section is perpendicular to the longitudinal axis of the second tube. In another example, the member is a plate. Other examples of members and variations of second tubes are left to the artisan.

In one embodiment of the first method, the fold is an annular fold substantially coaxially aligned with the longitudinal axis, and step d) creates an annular (or non-annular) weld zone. In one variation, the annular fold is a radially-outwardly-protruding annular fold. In another variation, the annular fold is a radially-inwardly-protruding annular fold. In the same or a different embodiment, the end portion includes at least one additional annular fold coaxially aligned with the longitudinal axis and having two longitudinally spaced-apart fold portions.

In one implementation of the first method, step d) uses a resistance-welding first electrode contacting the tube proximate the fold and a resistance-welding second electrode contacting the member. In one modification a non-electrode support is disposed inside or outside the tube, and in one example extends around the other end of the tube, to radially support the tube and/or to axially support or push the tube during step d).

In one execution of the first method, step d) does not melt any of the end portion and does not melt any of the member. In another execution of the first method, step d) melts at least some of the end portion or at least some of the member or at least some of the end portion and at least some of the member.

Figure 2:
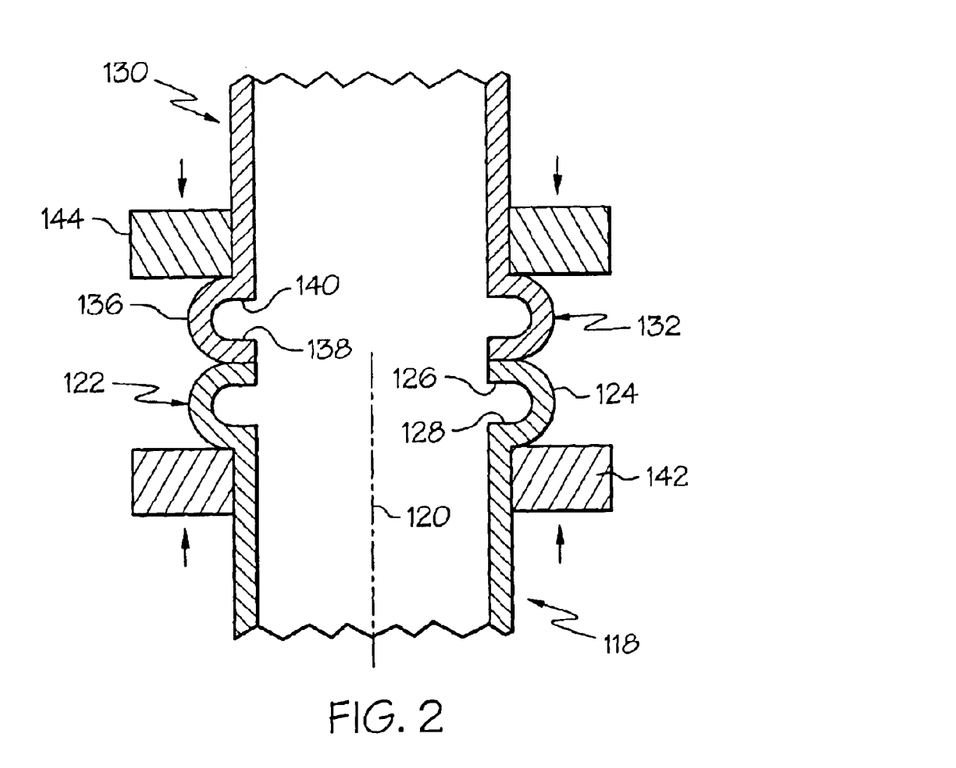
FIG. 2 is a schematic, side cross-sectional view of the first embodiment of first and second tubes and welding electrodes used in a first example of the second method, showing the tubes aligned.
Figure 3:
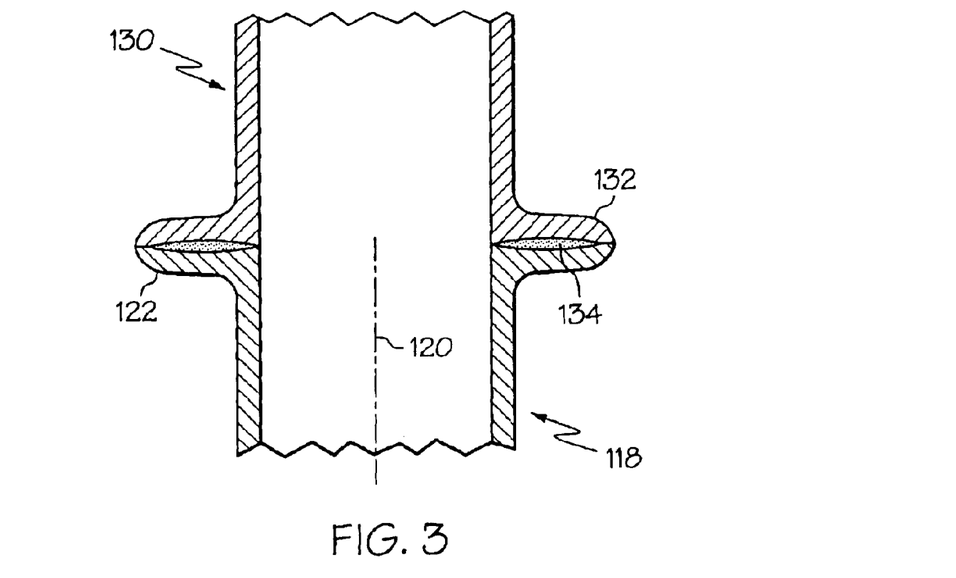
FIG. 3 is a view, as in FIG. 2, but showing the two tubes metallurgically joined together with the welding electrodes removed.

Referring to the first embodiment of FIGS. 2–3, wherein like numerals represent like elements throughout, a second method of the invention is for metallurgically joining one tube to another tube and includes steps a) through d). Step a) includes obtaining a first tube 118 having a longitudinal axis 120 and having a first end portion 122, wherein the first end portion includes a first annular fold 124 substantially coaxially aligned with the longitudinal axis 120, and wherein the first annular fold 124 includes longitudinally-spaced-apart first and second fold portions 126 and 128. Step b) includes obtaining a second tube 130 having a second end portion 132. Step c) includes, after steps a) and b), coaxially aligning the first and second tubes 118 and 130 and disposing the first and second tubes 118 and 130 with the first end portion 122 contacting the second end portion 132. Step d) includes, after step c), creating a resistance welding current path through the first and second tubes 118 and 130 proximate the first and second end portions 122 and 132 and relatively longitudinally moving the first end portion 122 deformingly against the second end portion 132 creating an annular weld zone 134 which includes at least some of the first end portion 122 and at least some of the second end portion 132.

In a first example of the second method, the second end portion 132 includes a second annular fold 136 having longitudinally spaced-apart third and fourth fold portions 138 and 140, wherein the wall thicknesses of the first and second tubes 118 and 130 are substantially equal, and wherein step c) disposes the first and second tubes 118 and 130 with the second annular fold 136 longitudinally contacting the first annular fold 126. In one variation, the first and second annular folds 124 and 136 each are radially-outwardly-protruding annular folds. In one implementation, step d) uses an annular resistance-welding first electrode 142 longitudinally contacting the first annular fold 124 and uses an annular resistance-welding second electrode 144 longitudinally contacting the second annular fold 136. Unnumbered arrows in the figures indicate the direction of relative longitudinal movement of the electrodes during step d). In one modification, the first electrode 142 longitudinally contacts the second electrode 144 at the completion of step d). This ensures that no overheating of the weld zone will occur, as can be appreciated by those skilled in the art.

In one construction for the first example of the second method, the first and second tubes 118 and 130 comprise low carbon steel such as AISI 1008 to 1010 having an outside diameter of generally 6 millimeters and a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes/support. The first, second, and/or third methods are not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

Figure 4:
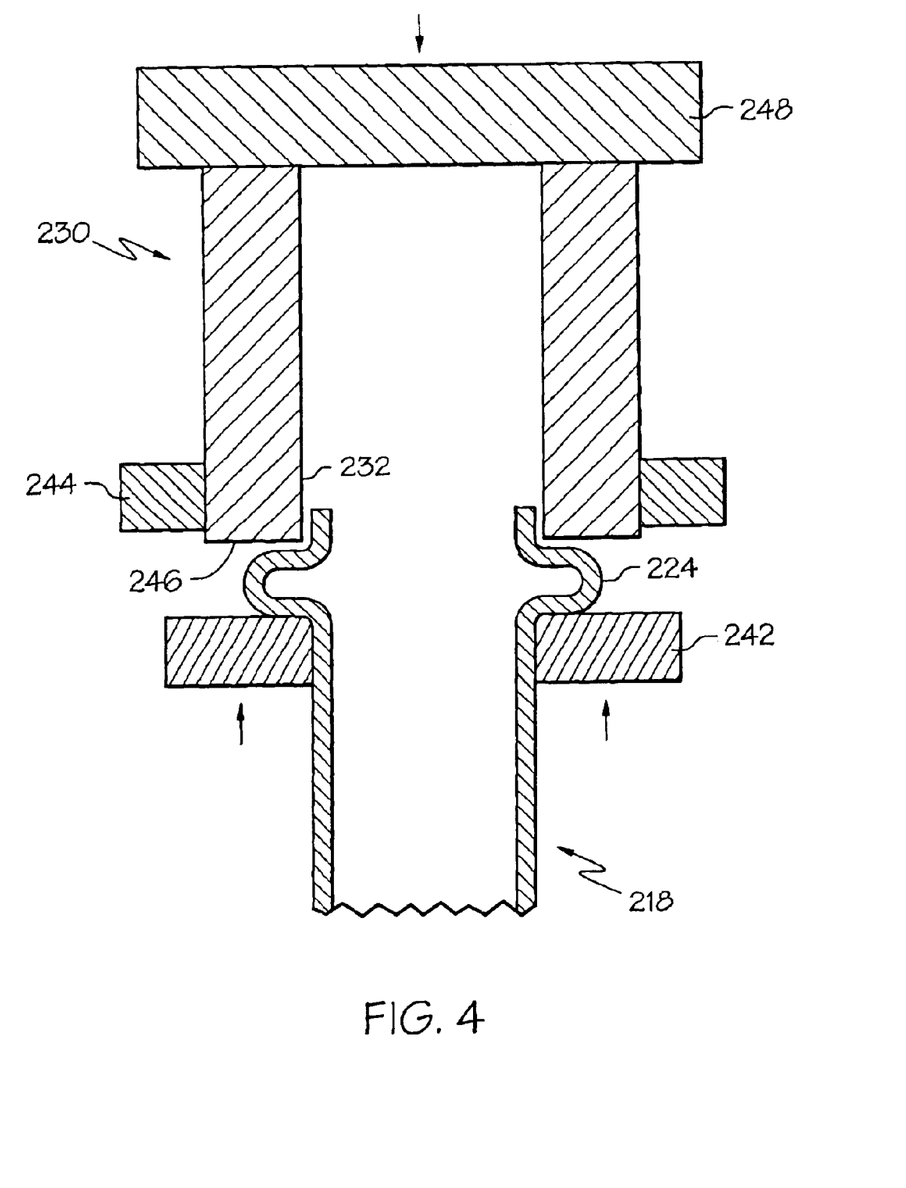
FIG. 4 is a view, as in FIG. 2, but showing a second embodiment of the tubes and welding electrodes used in a second example of the second method.

In a second example of the second method, and referring to the second embodiment of FIG. 4, the second end portion 232 of the second tube 230 is a substantially straight end portion having a substantially-longitudinally-facing annular end 246, wherein the second tube 230 has a greater wall thickness than the first tube 218, and wherein step c) disposes the first and second tubes 218 and 230 with the annular end 246 longitudinally contacting the first annular fold 224. In one application, the second tube 230 is a nut. In one variation, the first annular fold 224 is a radially-outwardly-protruding annular fold. In one implementation, step d) uses an annular resistance-welding first electrode 242 longitudinally contacting the first annular fold 224 and uses a resistance-welding second electrode 244 disposed in radial contact with the second end portion 232. In one modification, the first electrode 242 longitudinally contacts the second electrode 244 at the completion of step d). In one arrangement, a non-electrode support 248 contacts the other end of the second tube 230. In the same or another arrangement, an annular electrode, not shown, is added inside the second tube. Other arrangements of electrodes and non-electrode supports are left to the artisan.

Figure 5:
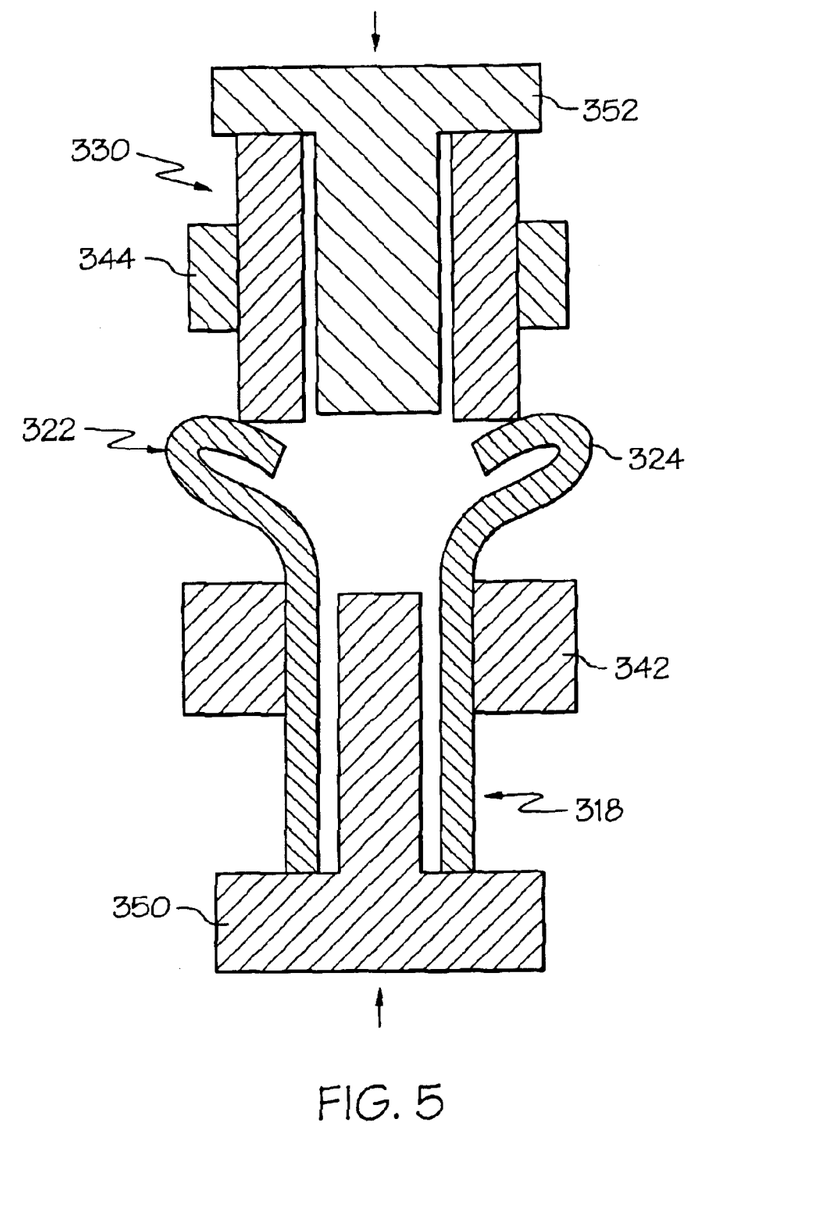
FIG. 5 is a view, as in FIG. 2, but showing a third embodiment of the tubes and welding electrodes used in an alternate second example of the second method.

In an alternate second example of the second method, and referring to the third embodiment of FIG. 5, the first annular fold 324 of the first end portion 322 of the first tube 318 protrudes radially outward and longitudinally upward as shown in the figure. The first electrode 342 is disposed outside the first tube 318, and the second electrode 344 is disposed outside the second tube 330. A non-electrode first support 350 is disposed inside the first tube 318 and extends around the other end of the first tube 318, and a non-electrode second support 352 is disposed inside the second tube 330 and extends around the other end of the second tube 330. In one variation, not shown, the positions of the first electrode and the first support are interchanged, and the positions of the second electrode and the second support are interchanged.

Other embodiments for the second method are left to the artisan. Optional examples, enablements, etc. of the first method applicable to tube-to-tube joining are equally applicable to the second method.

Figure 6:
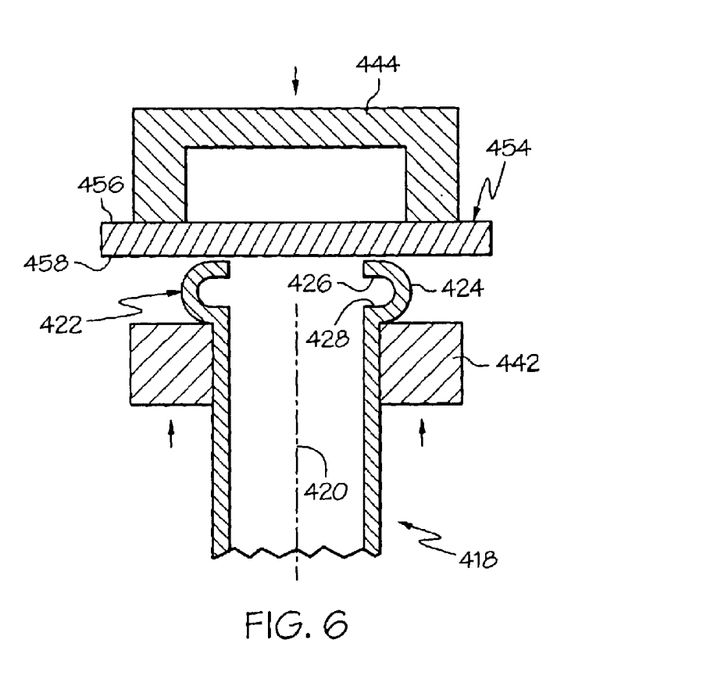
FIG. 6 is a schematic, side cross-sectional view of an embodiment of a tube, a plate, and welding electrodes used in the third method, showing the tube aligned with the plate.

Referring to the embodiment of FIG. 6, a third method of the invention is for metallurgically joining a tube to a plate and includes steps a) through d). Step a) includes obtaining a tube 418 having a longitudinal axis 420 and having an end portion 422, wherein the end portion 422 includes an annular fold 424 substantially coaxially aligned with the longitudinal axis 420, and wherein the annular fold 424 includes longitudinally-spaced-apart first and second fold portions 426 and 428. Step b) includes obtaining a plate 454 having first and second sides 456 and 458. Step c) includes, after steps a) and b), aligning the tube 418 substantially perpendicular to the plate 454 and disposing the tube 418 and the plate 454 with the end portion 422 contacting the second side 458. Step d) includes, after step c), creating a resistance welding current path through the tube 418 and the plate 454 proximate the end portion 422 and relatively longitudinally moving the end portion 422 deformingly against the plate 454 creating an annular weld zone which includes at least some of the end portion 422 and at least some of the plate 454.

In one implementation of the third method, step d) uses an annular resistance-welding first electrode 442 longitudinally contacting the annular fold 424. In the same or a different implementation, step d) uses an annular resistance-welding second electrode 444 which is substantially coaxially aligned with the longitudinal axis 420 and which longitudinally contacts the first side 456 of the plate 454 only outside an area on the first side 456 corresponding to the area on the second side 458 of the plate 454 where the annular fold 424 contacts the second side 458 of the plate 454. In one construction, the plate 454 is a sheet metal plate. Other implementations and constructions are left to the artisan. Optional examples, enablements, etc. of the first method applicable to tube-to-plate joining are equally applicable to the third method.

In one design for the first, second, and/or third method, the previously-discussed electrodes are installed in "T"-shaped electrode holders of a resistance welding machine (not shown). In one example, not shown, each electrode is formed from two sections which are brought together around the tube or on the plate and engage that tube or plate. The electrode sections have surfaces generally corresponding to the shape of the engaged portion of that tube or plate. The electrode sections are attached together before installing the electrode in the corresponding upper or lower one of the "T"-shaped electrode holders of the resistance welding machine.

It is noted that resistance welding is less expensive than gas metal arc welding or friction welding. Resistance welding also has a shorter cycle time between welds than does gas metal arc welding or friction welding.

Figure 7:
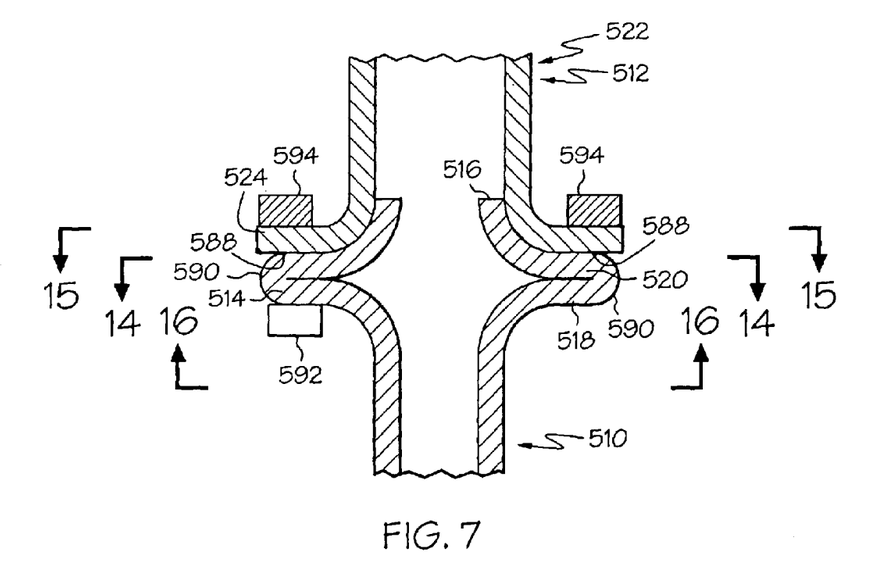
FIG. 7 is a schematic, side cross-sectional view of an embodiment of two tubes positioned for joining together by a particular method of the invention.

In preparation for a description of a particular method of the invention, FIGS. 7–13 give examples of first tubes and members (including members which are second tubes and including members which are non-tubular members with and without through holes). FIG. 7 gives an example showing a first tube 510 having a flange 514, wherein the flange 514 is an annular outwardly-extending end flange disposed proximate an end 516 of the first tube 510. In this example, the flange 514 is a folded flange having contacting first and second fold portions 518 and 520, and the member 512 is a second tube 522 having a flange 524 which is an annular outwardly-extending and non-folded end flange.

Figure 8:
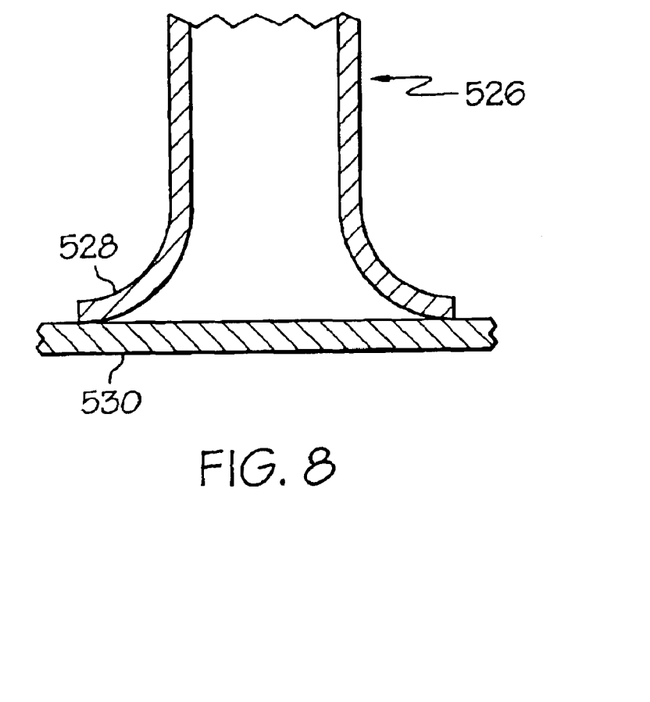
FIG. 8 is a view, as in FIG. 7, but of a tube having a non-folded end flange positioned for joining to a plate and with the welding/brazing electrodes omitted for clarity.
Figure 9:
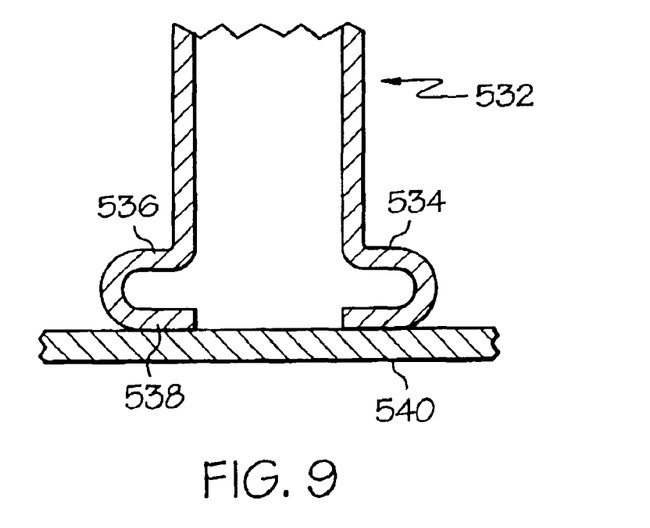
FIG. 9 is a view, as in FIG. 7, but of a tube having a folded end flange positioned for joining to a plate and with the welding/brazing electrodes omitted for clarity.

FIG. 8 gives another example showing a first tube 526 having a flange 528 which is an annular outwardly-extending and non-folded end flange and showing a member 530 which is a non-tubular member and in particular is a plate (such as a sheet metal plate). FIG. 9 gives another example showing a first tube 532 having a flange 534 which is an annular outwardly-extending and folded end flange having spaced-apart first and second fold portions 536 and 538 and showing a member 540 which is a non-tubular member and in particular is a plate (such as a sheet metal plate).

Figure 10:
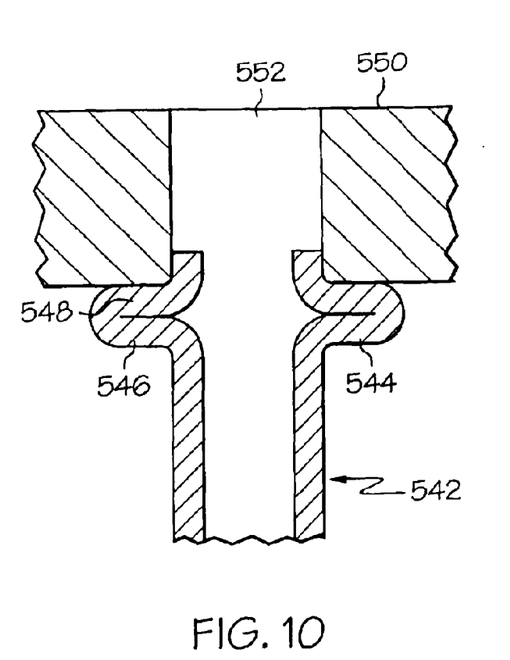
FIG. 10 is a view, as in FIG. 7, but of a tube having a folded end flange positioned for joining to a thicker solid having a through hole and with the welding/brazing electrodes omitted for clarity.
Figure 11:
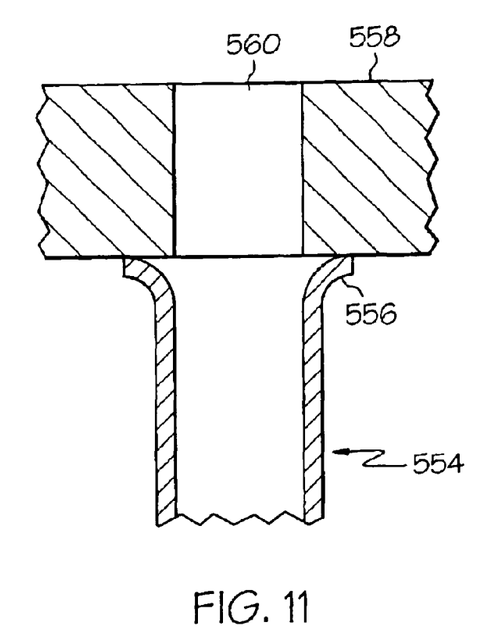
FIG. 11 is a view, as in FIG. 7, but of a tube having a non-folded end flange positioned for joining to a thicker solid having a through hole and with the welding/brazing electrodes omitted for clarity.

FIG. 10 gives another example showing a first tube 542 having a flange 544 which is an annular outwardly-extending and folded end flange having contacting first and second fold portions 546 and 548 and showing a member 550 which is a non-tubular member and in particular is a thicker solid having a through hole 552. FIG. 11 gives another example showing a first tube 554 having a flange 556 which is an annular outwardly-extending and non-folded end flange and showing a member 558 which is a non-tubular member and in particular is a thicker solid having a through hole 560.

Figure 12:
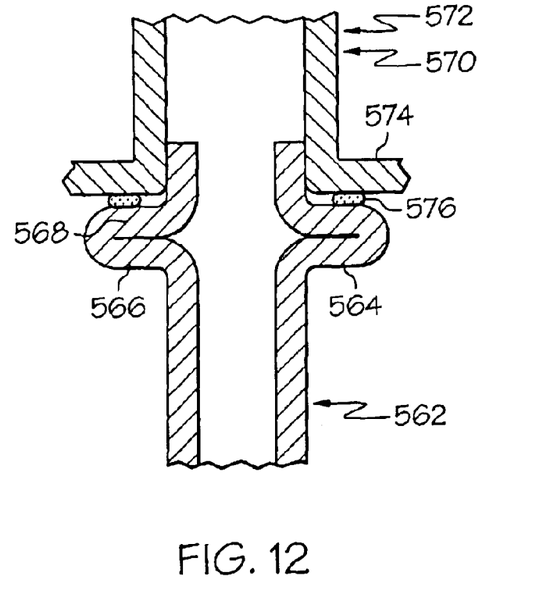
FIG. 12 is a view, as in FIG. 7, but with an intervening welding/brazing joining material disposed between the flange of the first tube and the member and with the welding/brazing electrodes omitted for clarity.

FIG. 12 gives another example showing a first tube 562 having a flange 564, wherein the flange 564 is an annular outwardly-extending end flange. In this example, the flange 564 is a folded flange having contacting first and second fold portions 566 and 568, and the member 570 is a second tube 572 having a flange 574 which is an annular outwardly-extending and non-folded end flange. A welding/brazing joining material 576 is shown disposed on the flange 564 of the first tube 562. In one construction, the welding/brazing joining material 576 is either unattached to the flange and the member or is plated to at least one of the flange and the member. Examples of welding/brazing joining materials include welding brazing materials and/or welding joining materials. In one variation, not shown, the flange 564 has at least one groove containing at least some of the welding/brazing joining material 576, wherein the flange 564 outside the groove is in direct contact with the member 570 to facilitate the passage of current between the flange 564 and the member 570.

Figure 13:
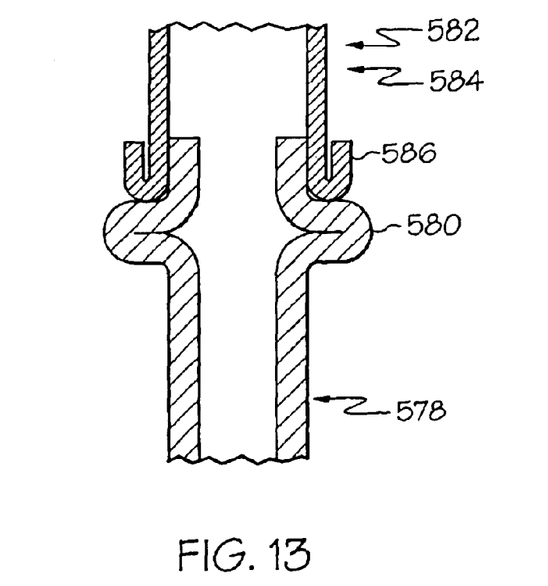
FIG. 13 is a view, as in FIG. 7, but showing both a "transverse-folded" flange and a "centerline-folded" flange and with the welding/brazing electrodes omitted for clarity.

FIG. 13 gives another example showing a first tube 578 having a flange 580, wherein the flange 580 is an annular outwardly-extending end flange which is a folded flange folded along a transverse direction which is substantially transverse to the centerline of the tube. In this example, the member 582 is a second tube 584 having a flange 586, wherein the flange 586 is an annular outwardly-extending end flange which is a folded flange folded along a direction which is substantially parallel to the centerline of the tube.

Figure 14:
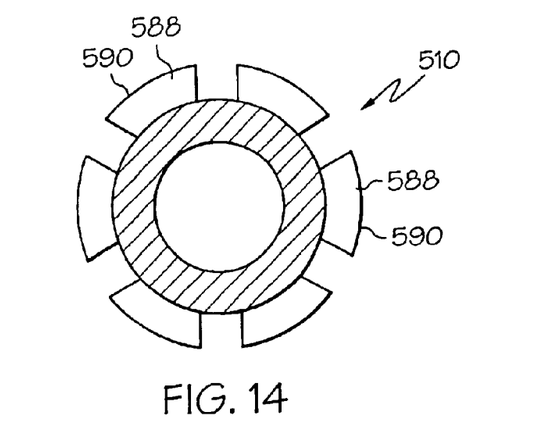
FIG. 14 is a view, taken along lines 14—14 in FIG. 7 showing the annular segments of the flange of the first tube of FIG. 7.
Figure 15:
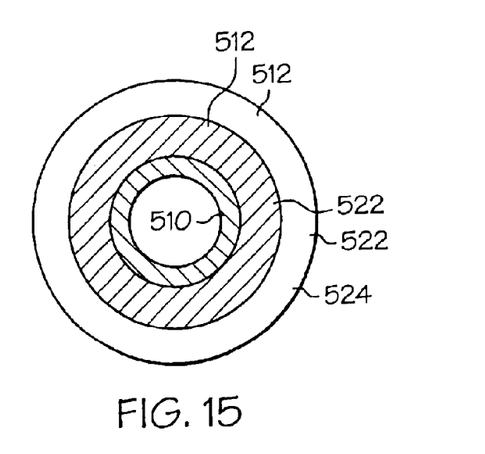
FIG. 15 is a view, taken along lines 15—15 in FIG. 7 showing the end flange of the second tube of FIG. 7 to be a non-segmented end flange.

Referring to FIGS. 7, 14 and 15, a particular method of the invention is for metallurgically joining a first tube 510 to a member 512 and includes steps a) through e). Step a) includes obtaining a first tube 510 having a flange 514, and step b) includes obtaining a member 512. Step c) includes, after steps a) and b), disposing the first tube 510 and the member 512 with the flange 514 contacting the member 512 directly and/or indirectly through an intervening welding/brazing joining material 576 (seen in FIG. 12), wherein at least one of the flange 514 and the member 512 is segmented, and wherein the contact between the flange 514 and the member 512 is a segmented contact at a plurality of spaced-apart contact areas 588 between the flange 514 and the member 512. Step d) includes, after step c), creating a resistance welding/brazing current path through the first tube 510 and the member 512 at a first one of the plurality of contact areas 588 creating a first weld/braze zone which includes at least some of the flange 514 and at least some of the member 512. Step e) includes, after step d), creating a resistance welding/brazing current path through the first tube 510 and the member 512 at a different second one of the plurality of contact areas 588 creating a second weld/braze zone which includes at least some of the flange 514 and at least some of the member 512. The term "welding/brazing" includes welding or brazing or partially welding and partially brazing.

In one variation of the particular method, in step c) the welding/brazing joining material 576 (seen in FIG. 12) is either unattached to the flange and the member or is plated to at least one of the flange and the member. In one enablement, the welding/brazing material 576 is not used, and in a different enablement, the welding/brazing material 576 is used. In the same or a different variation, the flange 514 is an annular outwardly-extending end flange disposed proximate an end 516 of the first tube 510. In one modification, there is also included, during step d), the step of applying a force to relatively move the flange 514 deformingly against the member 512 at, and only at the first one of the contact areas 588, and there is further included, during step e), the step of applying a force to relatively move the flange 514 deformingly against the member 512 at, and only at, the second one of the contact areas 588. In a different modification, steps d) and e) are performed without applying a force to relatively move any portion of the flange 514 deformingly against the member 512.

In one enablement of the particular method, the flange 514 is an end flange including a plurality of spaced-apart annular segments 590, and the contact between the end flange and the member is a contact between each of the annular segments 590 of the end flange and the member 512. In one variation, the member 512 is a second tube 522. In one modification, the second tube 522 has a flange 524 which is an annular outwardly-extending end flange, and step c) disposes the first tube 510 and the second tube 522 with each of the annular segments 590 of the flange 514 of the first tube 510 contacting the end flange of the second tube 522 either directly and/or indirectly through an intervening welding/brazing joining material. In one design, the end flange of the second tube 522 is a non-segmented end flange. In another variation, such as seen in the example of FIG. 10, the member 550 is a non-tubular member. In one modification, the member 550 is a non-tubular member having a through hole 552, and step c) coaxially aligns the first tube 542 with the through hole 552 of the non-tubular member with each of the annular segments of the flange of the first tube contacting the non-tubular member either directly or through an intervening welding/brazing joining material.

An additional particular method of the invention is for metallurgically joining a first tube 510 to a member 512 and includes steps a) through e). Step a) includes obtaining a first tube 510 having a flange 514, and step b) includes obtaining a member 512. Step c) includes, after steps a) and b), disposing the first tube 510 and the member 512 with the flange 514 contacting the member 512 directly and/or indirectly through an intervening welding joining material, wherein at least one of the flange 514 and the member 512 is segmented, and wherein the contact between the flange 514 and the member 512 is a segmented contact at a plurality of spaced-apart contact areas 588 between the flange 514 and the member 512. Step d) includes, after step c), creating a resistance welding current path through the first tube 510 and the member 512 at one of the plurality of contact areas 588 creating a weld zone which includes at least some of the flange 514 and at least some of the member 512. Step e) includes, repeating step d) once for each of the remaining ones of the contact areas 588 each time creating a different weld zone which includes at least some of the flange 514 and at least some of the member 512.

In one variation of the additional particular method, step c) disposes the first tube 510 and the member 512 with the flange 514 contacting the member 512 directly. In a different variation, seen in FIG. 12, step c) disposes the first tube 562 and the member 570 with the flange 564 contacting the member 570 indirectly through an intervening welding joining material, and wherein the intervening welding joining material is a filler metal ring disposed between and directly contacting the flange 564 and the member 570. In one design, seen in FIG. 7, the flange 514 is an annular outwardly-extending end flange having a plurality of spaced-apart annular segments 590, wherein the contact between the end flange and the member is a contact between each of the annular segments 590 of the end flange and the member 512. In one modification, the member 512 is a second tube 522 having a flange 524 which is an annular outwardly-extending end flange, wherein the end flange of the second tube 522 is a non-segmented end flange, and step c) disposes the first tube 510 and the second tube 522 with each of the annular segments 590 of the flange 514 of the first tube 510 contacting the end flange of the second tube 522 either directly or through an intervening welding joining material.

A further particular method of the invention, as seen in FIG. 12, is for metallurgically joining a first tube 562 to a member 570 and includes steps a) through e). Step a) includes obtaining a first tube 562 having a flange 564, and step b) includes obtaining a member 570. Step c) includes, after steps a) and b), disposing the first tube 562 and the member 570 with the flange 564 contacting the member 570 indirectly through an intervening brazing joining material, wherein at least one of the flange 564 and the member 570 is segmented, and wherein the contact between the flange 564 and the member 570 is a segmented contact at a plurality of spaced-apart contact areas between the flange 564 and the member 570. Step d) includes, after step c), creating a resistance brazing current path through the first tube 562 and the member 570 at one of the plurality of contact areas creating a braze zone which includes at least some of the flange 564 and at least some of the member 570. Step e) includes repeating step d) once for each of the remaining ones of the contact areas each time creating a different braze zone which includes at least some of the flange 564 and at least some of the member 570.

In one enablement of the further particular method, the brazing joining material is a brazing ring. In one variation, the flange 564 is an annular outwardly-extending end flange having a plurality of spaced-apart annular segments, and the contact between the end flange and the member 570 is an indirect contact between each of the annular segments of the end flange and the member 570 through the brazing joining material. In one modification, the member 570 is a second tube 572 having a flange 574 which is an annular outwardly-extending end flange, wherein the end flange of the second tube 572 is a non-segmented end flange, and wherein step c) disposes the first tube 562 and the second tube 572 with each of the annular segments of the flange 564 of the first tube 562 contacting the end flange of the second tube 572 indirectly through the intervening brazing joining material.

Figure 16:
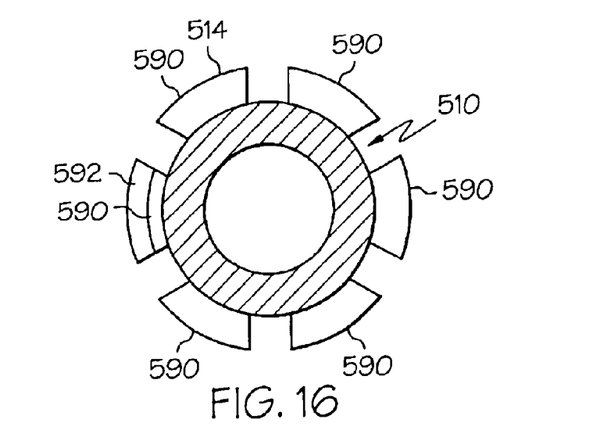
FIG. 16 is a view, taken along lines 16—16 in FIG. 7 showing the first-tube welding/brazing electrode of FIG. 7 to be a single annular-segment electrode spanning a single annular segment of the flange of the first tube.

FIGS. 7 and 16 disclose a first welding/brazing electrode embodiment, wherein first-tube electrode 592 is a single annular-segment electrode spanning a single annular segment 590 of the flange 514 of the first tube 510. In one variation, first-tube electrode 592 is moved to the next annular segment 590 to create the next weld/braze zone. In another variation, the first-tube electrode 592 is stationary, and the first tube 510 and the member 512 are rotated as a unit to bring the next annular segment 590 into welding/brazing alignment with the first-tube electrode 592. In another embodiment, not shown, the first-tube electrode includes the same number of spaced-apart annular-segment electrodes as there are annular segments 590 of the flange 514 of the first tube 510, wherein each annular-segment electrode is activated, in sequence, to sequentially create the weld/braze zones. In one application, an annular-segment electrode substantially exactly overlays an annular segment 590 of the flange 514 of the first tube 510. In another application, the overlay of an annular-segment electrode is smaller than or larger than an annular segment 590. In one design, not shown, the member electrode 594 is a split ring electrode (to allow the member electrode 594 to surround the second tube 522) whose two welding/brazing segments are in electrical contact with each other at all times during welding/brazing. In another design, not shown, the member and the member electrode are segmented. Particular segmented first tube, segmented first-tube electrode, member, and member electrode shapes are left to the artisan. In one modification, the weld/braze is leak tight, and in another modification, the weld/braze is not leak tight.

In one variation, not shown in FIGS. 7–13, a flange, such as flange 514, is not an annular flange but has a plurality of widely-circumferentially-separated flange segments at the same or different tube heights. In the same or another variation, not shown, the flange is an inwardly-extending flange. In the same or another variation, not shown, the flange is not an end flange disposed proximate an end of the tube but is a flange disposed at a location which is not proximate an end of the tube. Although not shown, the flanges of the first tubes and/or the members of FIGS. 8–13 are segmented, similar to the segments (shown in FIG. 14) of the flange 514 of the first tube 510 (shown in FIG. 7) but in an annular or non-annular manner. Other variations of flanges are left to the artisan. In one modification, the first tube, such as first tube 510, is a straight tube or is a curved tube (not shown). In the same or another modification, the first tube is a round tube, a square tube, or a rectangular tube. Other shapes of first tubes are left to the artisan.

Several benefits and advantages are derived from one or more of the methods of the invention. The use of a tube flange in joining a tube to a member provides a stronger joint and allows easier joining of thin walled tubes. By having at least one of the tube flange and the member be segmented providing a segmented contact between the flange and the member allows a smaller current to be used to resistance weld/braze together the tube flange and the member by resistance welding/brazing only at one segmented contact at a time.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for metallurgically joining a first tube to a member comprising the steps of:
   a) obtaining a first tube having a flange;
   b) obtaining a member;
   c) after steps a) and b), disposing the first tube and the member with the flange contacting the member directly and/or indirectly through an intervening welding/brazing joining material, wherein at least one of the flange and the member is segmented, and wherein the contact between the flange and the member is a segmented contact at a plurality of spaced-apart contact areas between the flange and the member;
   d) after step c), creating a resistance welding/brazing current path through the first tube and the member at a first one of the plurality of contact areas creating a first weld/braze zone which includes at least some of the flange and at least some of the member; and
   e) after step d), creating a resistance welding/brazing current path through the first tube and the member at a different second one of the plurality of contact areas creating a second weld/braze zone which includes at least some of the flange and at least some of the member.

2. A method for metallurgically joining a first tube to a member comprising the steps of:
   a) obtaining a first tube having a flange;
   b) obtaining a member;
   c) after steps a) and b), disposing the first tube and the member with the flange contacting the member directly and/or indirectly through an intervening welding/brazing joining material, wherein at least one of the flange and the member is segmented, and the contact between the flange and the member is a segmented contact at a plurality of spaced-apart contact areas between the flange and the member;
   d) after step c), creating a resistance welding/brazing current path through the first tube and the member at a first one of the plurality of contact areas creating a first weld/braze zone which includes at least some of the flange and at least some of the member; and
   e) after step d) creating a resistance welding/brazing current path through the first tube and the member at a different second one of the plurality of contact areas creating a second weld/braze zone which includes at least some of the flange and at least some of the member, wherein in step c) the welding/brazing joining material is either unattached to the flange and the member or is plated to at least one of the flange and the member.

3. The method of claim 1, wherein the flange is an annular outwardly-extending end flange disposed proximate an end of the first tube.

4. The method of claim 3, also including, during step d), the step of applying a force to relatively move the flange deformingly against the member at, and only at the first one of the contact areas, and further including, during step e), the step of applying a force to relatively move the flange deformingly against the member at, and only at, the second one of the contact areas.

5. A method for metallurgically joining a first tube to a member comprising the steps of:
   a) obtaining a first tube having a flange;
   b) obtaining a member;
   c) after steps a) and b), disposing the first tube and the member with the flange contacting the member directly and/or indirectly through an intervening welding/brazing joining material, wherein at least one of the flange and the member is segmented, and wherein the contact between the flange and the member is a segmented contact at a plurality of spaced-apart contact areas between the flange and the member;
   d) after step c), creating a resistance welding/brazing current path through the first tube and the member at a first one of the plurality of contact areas creating a first weld/braze zone which includes at least some of the flange and at least some of the member; and
   e) after step d), creating a resistance welding/brazing current path through the first tube and the member at a different second one of the plurality of contact areas creating a second weld/braze zone which includes at least some of the flange and at least some the member, wherein the flange is an annular outwardly-extending end flange disposed proximate an end of the first tube, and wherein steps d) and e) are performed without applying a force to relatively move any portion of the flange deformingly against the member.

6. The method of claim 3, wherein the end flange includes a plurality of spaced-apart annular segments, and wherein the contact between the end flange and the member is a contact between each of the annular segments of the end flange and the member.

7. The method of claim 6, wherein the member is a second tube.

8. A method for metallurgically joining a first tube to a member comprising the steps of:
   a) obtaining a first tube having a flange;
   b) obtaining a member;
   c) after steps a) and b), disposing the first tube and the member with the flange contacting the member directly and/or indirectly through an intervening welding/brazing joining material, wherein at least one of the flange and the member is segmented, and wherein the contact between the flange and the member is a segmented contact at a plurality of spaced-apart contact areas between the flange and the member;

d) after step c), creating a resistance welding/brazing current path through the first tube and the member at a first one of the plurality of contact areas creating a first weld/braze zone which includes at least some of the flange and at least some of the member; and e) after step d), creating a resistance welding/brazing current path through the first tube and the member at a different second one of the plurality of contact areas creating a second weld/braze zone which includes at least some of the flange and at least some of the member, wherein the flange is an annular outwardly-extending end flange disposed proximate an en of the first tube, wherein the end flange includes a plurality of spaced-apart annular segments, and wherein the contact between the end flange and the member is a contact between each of the annular segments of the end flange and the member, wherein the member is a second tube, wherein the second tube has an annular outwardly-extending end flange, and wherein step c) disposes the first tube and the second tube with each of the annular segments of the flange of the first tube contacting the end flange of the second tube either directly and/or through an intervening welding/brazing joining material.

9. The method of claim 8, wherein the end flange of the second tube is a non-segmented end flange.

10. The method of claim 1, wherein the member is a non-tubular member.

11. A method for metallurgically joining a first tube to a member comprising the steps of:

a) obtaining a first tube having a flange;

b) obtaining a member;

c) after steps a) and b), disposing the first tube and the member with the flange contacting the member directly and/or indirectly through an intervening joining material, wherein at least one of the flange and the member is segmented and wherein the contact between the flange and the member is a segmented contact at a plurality of spaced-apart contact areas between the flange and the member;

d) after step c), creating a resistance welding/brazing current path through the first tube and the member at a first one of the plurality of contact areas creating a first weld/braze zone which includes at least some of the flange and at least some of the member; and e) after step d) creating a resistance welding/brazing current path through the first tube and the member at a different second one of the plurality of contact areas creating a second weld/braze zone which includes at least some of the flange and at least some of the member wherein the flange is an annular outwardly-extending end flange disposed proximate an end of the first tube, wherein the end flange includes a plurality of spaced-apart annular segments and wherein the contact between the end flange and the member is a contact between each of the annular segments of the end flange and the member, and wherein the member is a non-tubular member having a through hole, and wherein step c) coaxially aligns the first tube with the through hole of the non-tubular member with each of the annular segments of the flange of the first tube contacting the non-tubular member either directly or through an intervening welding/brazing joining material.

12. A method for metallurgically joining a first tube to a member comprising the steps of:

a) obtaining a first tube having a flange;

b) obtaining a member;

c) after steps a) and b), disposing the first tube and the member with the flange contacting the member directly and/or indirectly through an intervening welding joining material, wherein at least one of the flange and the member is segmented, and wherein the contact between the flange and the member is a segmented contact at a plurality of spaced-apart contact areas between the flange and the member;

d) after step c), creating a resistance welding current path through the first tube and the member at one of the plurality of contact areas creating a weld zone which includes at least some of the flange and at least some of the member; and e) repeating step d) once for each of the remaining ones of the contact areas each time creating a different weld zone which includes at least some of the flange and at least some of the member.

13. The method of claim 12, wherein step c) disposes the first tube and the member with the flange contacting the member directly.

14. A method for metallurgically joining a first tube to a member comprising the steps of:

a) obtaining a first tube having a flange;

b) obtaining a member;

c) after steps a) and b), disposing the first tube and the member with the flange contacting the member directly and/or indirectly through an intervening welding joining material, wherein at least one of the flange and the member is segmented and wherein the contact between the flange and the member is a segmented contact at a plurality of spaced-apart contact areas between the flange and the member;

d) after step c) creating a resistance welding current path through the first tube and the member at one of the plurality of contact areas creating a weld zone which includes at least some of the flange and at least some of the member; and e) repeating step d) once for each of the remaining ones of the contact areas each time creating a different weld zone which includes at least some of the flange and at least some of the member wherein step c) disposes the first tube and the member with the flange contacting the member indirectly through an intervening welding joining material, and wherein the intervening welding joining material is a filler metal ring disposed between and directly contacting the flange and the member.

15. A method for metallurgically joining a first tube to a member comprising the steps of:

a) obtaining a first tube having a flange;

b) obtaining a member;

c) after steps a) and b), disposing the first tube and the member with the flange contacting the member directly and/or indirectly through an intervening welding joining material, wherein at least one of the flange and the member is segmented, and wherein the contact between the flange and the member is a segmented contact at a plurality of spaced-apart contact areas between the flange and the member;

d) after step c), creating a resistance welding current path through the first tube and the member at one of the plurality of contact areas creating a weld zone which includes at least some of the flange and at least some of the member; and e) repeating step d) once for each of the remaining ones of the contact areas each time creating a different weld zone which includes at least some of the flange and at least some of the member, wherein the flange is an annular outwardly-extending end flange having a plurality of spaced-apart annular segments, and wherein the contact between the end flange and the member is a contact between each of the annular segments of the end flange and the member.

16. The method of claim 15, wherein the member is a second tube having an annular outwardly-extending end flange, wherein the end flange of the second tube is a non-segmented end flange, and wherein step c) disposes the first tube and the second tube with each of the annular segments of the flange of the first tube contacting the end flange of the second tube either directly or through an intervening welding joining material.

17. A method for metallurgically joining a first tube to a member comprising the steps of:
 a) obtaining a first tube having a flange;
 b) obtaining a member;
 c) after steps a) and b), disposing the first tube and the member with the flange contacting the member indirectly through an intervening brazing joining material, wherein at least one of the flange and the member is segmented, and wherein the contact between the flange and the member is a segmented contact at a plurality of spaced-apart contact areas between the flange and the member;
 d) after step c), creating a resistance brazing current path through the first tube and the member at one of the plurality of contact areas creating a braze zone which includes at least some of the flange and at least some of the member; and
 e) repeating step d) once for each of the remaining ones of the contact areas each time creating a different braze zone which includes at least some of the flange and it least some of the member.

18. The method of claim 17, wherein the brazing joining material is a brazing ring.

19. The method of claim 17, wherein the flange is an annular outwardly-extending end flange having a plurality of spaced-apart annular segments, and wherein the contact between the end flange and the member is an indirect contact between each of the annular segments of the end flange and the member through the brazing joining material.

20. The method of claim 19, wherein the member is a second tube having an annular outwardly-extending end flange, wherein the end flange of the second tube is a non-segmented end flange, and wherein step c) disposes the first tube and the second tube with each of the annular segments of the flange of the first tube contacting the end flange of the second tube indirectly through an intervening brazing joining material.

21. The method of claim 1, wherein the flange is segmented.

22. The method of claim 12, wherein the flange is segmented.

* * * * *